(12) United States Patent
Hagelin et al.

(10) Patent No.: US 6,347,002 B1
(45) Date of Patent: Feb. 12, 2002

(54) APPARATUS AND METHOD FOR OPTICAL RASTER-SCANNING IN A MICROMECHANICAL SYSTEM

(75) Inventors: Paul M. Hagelin, Saratoga; Olav Solgaard, Davis, both of CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 09/714,053

(22) Filed: Nov. 15, 2000

Related U.S. Application Data

(62) Division of application No. 09/337,016, filed on Jun. 30, 1999, now Pat. No. 6,246,504.

(51) Int. Cl.⁷ ............................................... G02B 26/08

(52) U.S. Cl. ..................... 359/201; 359/198; 359/202; 359/224

(58) Field of Search ............................ 359/198, 199, 359/201, 202, 223, 224

(56) References Cited

U.S. PATENT DOCUMENTS

| | | |
|---|---|---|
| 4,317,611 A | 3/1982 | Peterson |
| 5,361,158 A | 11/1994 | Tang |
| 5,408,352 A | 4/1995 | Peng |
| 5,629,790 A | 5/1997 | Neukermans et al. |
| 5,867,297 A | 2/1999 | Kiang et al. |
| 5,998,906 A * | 12/1999 | Jerman et al. ............... 310/309 |

OTHER PUBLICATIONS

Iin et al, "Free–Space Micromachined Optical Switches with Submillisecond Switching Time for Large–Scale Optical Crossconnects", IEEE Photonic Technology Letter, vol. 10, No. 4, pp. 525–527, Apr. 1998.*

Daneman et al., "Integrated Laser–to–Fiber Coupling Module Using a Micromachined Alignment Mirror", *Conference on Lasers and Electro–Optius*, 1995, Technical Digest Series, vol. 15, pp.245–250, Baltimore, MD, May 1995.

Daneman et al, "Linear Microvibromotor for Positioning Optical Components", *J of Microelectromechanical Systems*, 5(3):159–165 (1996). (No month).

Daneman et al., "Linear Vibromotor–Actuated Micromachined Microreflector for Integrated Optical Systems", *Solid–State Sensor and Actuator Workshop*, Hilton Head, SC, Jun. 2–6, 1996.

Deng et al., "The Development of Polysilicon Micromotors for Optical Scanning Applications", *Solid–State Sensor and Actuator Workshop*, pp. 234–238, Hilton Head, SC, Jun. 13–16, 1994.

Kiang et al., "Electrostatic Combdrive–Actuated Micromirrors for Laser–Beam Scanning and Positioning", *J of Microelectromechanical Systems*, 7(1):27–37, Mar. 1998.

(List continued on next page.)

*Primary Examiner*—James Phan
(74) *Attorney, Agent, or Firm*—Pennie & Edmonds LLP

(57) ABSTRACT

A method of operating a micromechanical scanning apparatus includes the steps of identifying a radius of curvature value for a micromechanical mirror and modifying a laser beam to compensate for the radius of curvature value. The identifying step includes the steps of measuring the far-field optical beam radius of a laser beam reflected from the micromechanical mirror. The measured far-field optical beam radius is then divided by a theoretical far-field optical beam radius reflected from an ideal mirror to yield a ratio value M. An analytical expression for M is curve-fitted to experimental data for M with the focal-length as a fitting parameter. The focal-length value determined by this procedure, resulting in a good fit between the analytical curve and the experimental data, is equal to half the radius of curvature of the micromechanical mirror. The micromechanical scanning apparatus is operated by controlling the oscillatory motion of a first micromechanical mirror with a first micromechanical spring and regulating the oscillatory motion of a second micromechanical mirror with a second micromechanical spring.

2 Claims, 11 Drawing Sheets

OTHER PUBLICATIONS

Kiang et al., "High–Precision Si–Micromachined Micromirrors with On–Chip Actuation for External–Cavity Semiconductor Lasers", *Conference on Lasers and Electro–Optics*, Technical Digest Series, vol. 15, pp. 248–249, Baltimore, MD, May 1995.

Kiang et al., "Micromachined Polysilicon Microscanners for Barcode Readers", *IEEE Photonics Technology Letters*, 8(12):1707–1709, Dec. 1996.

Kiang et al., "Silicon–Micromachined Micromirrors with Integrated High–Precision Actuators for External–Cavity Semiconductor Lasers", *IEEE Photonics Technology Letters*, 8(1):95–97 (1996). (No month).

Pister et al., "Microfabricated Hinges", *Sensors and Actuators*, 33(3):249–256 (1992). (No month).

Solgaard, O., "High–Resolution Silicon Surface Micromachined Displays", (invited talk), *Technical Digest of the IEEE/LEOS IEEJ/SAMS 1997 International Conference of Optial MEMS and their Applications* (MOEMS97), pp. 9–14, Nara, Japan, Nov. 18–21, 1997.

Solgaard et al., "Optoelectronic Packaging Using Silicon Surface–Micromachined Alignment Mirrors", *IEEE Photonics Technology Letters*, 7(1):41–43 (1995). (No month).

Solgaard et al., "Precision and Performance of Polysilicon Micromirrors for Hybrid Integrated Optics", *SPIE, Symposium on Lasers and Applications*, San Jose, CA, Feb. 1995.

Tien et al., "Surface–Micromachined Mirrors for Laser–Beam Positioning", *Sensors and Actuators*, A 52:76–80 (1996). (No month).

Tsufura et al., "Barcode Scanning On–Going Evolution & Development", *Lasers & Optronics*, Jul. 1995.

Yasseen et al., "Diffraction Grating Scanners Using Polysilicon Micromotors", *Proceedings IEEE Micro Electro Mechanical Systems*, pp. 175–180, Amsterdam, The Netherlands, Jan. 1995.

\* cited by examiner

APPARATUS AND METHOD FOR OPTICAL RASTER-SCANNING IN A MICROMECHANICAL SYSTEM This is a division of application Ser. No. 09/337,016 filed Jun. 30, 1999 now Pat. No. 6,246,504.

The development of the technology described herein was supported by NSF Grant No. EEC-96-15774 for the study of high-speed, high-resolution micro-optical scanners. The U.S. Government may have certain rights in this technology.

BRIEF DESCRIPTION OF THE INVENTION

This invention relates generally to optical scanners and displays. More particularly, this invention relates to an optical raster-scanning microelectromechanical system.

BACKGROUND OF THE INVENTION

Scanning micromirrors fabricated using surface-micromachining technology are known in the art. As used herein, a micromirror, a microscopic device, a micromachined device, a micromechanical device, or a microelectromechanical device refers to a device with a third dimension above a horizontal substrate that is less than approximately several milli-meters. Such devices are constructed using semiconductor processing techniques.

Scanning micromirrors have numerous advantages over traditional scanning mirrors. For example, they have smaller size, mass, and power consumption, and can be more readily integrated with actuators, electronics, light sources, lenses and other optical elements. More complete integration simplifies packaging, reducing the manufacturing cost. These factors add motivation to the development of microfabricated scanners. In addition to displays, high-speed, high-resolution micro-optical scanners have numerous additional applications in medicine, lithography, printing, data storage and data retrieval.

U.S. Pat. No. 5,867.297 (the '297 patent) entitled "Apparatus and Method for Optical Scanning with an Oscillatory Microelectromechanical System" describes early seminal work in the field of oscillatory micromirrors. The contents of the '297 patent are expressly incorporated by reference herein.

The required system tolerances in a system of the type described in the '297 patent are extremely high. For example, bending of torsional hinges causes system wobble, defined as rotation about an axis in the mirror plane orthogonal to the primary scan axis. In a two mirror system including a fast mirror and a slow mirror, fast mirror wobble of less than 1% of the total deflection angle will cause scan lines to overlap and seriously degrade image quality. In the slow mirror, rotational errors known as jitter, attributable to errors in following the driving signal, can induce non-uniform line spacing. It would be highly desirable to establish improved mechanical linkages to enhance mirror performance.

Large mirror diameters and rotational angles, facilitated by a tilt-up mirror design, are key to the resolution of a scanning system. Moving a large mirror quickly through a large angle requires high-force actuators and stiff springs to achieve a high resonant frequency. Mechanically, the image resolution is limited by the number of lines that the fast mirror can scan during the refresh period of the slow mirror. Optically, the resolution is given by the size, flatness and rotational angle of the mirror. Increasing the mirror diameter results in higher resolution only if the mirror is flat, or if its curvature is optically corrected. It would be highly desirable to provide a method of characterizing and correcting static mirror curvature to improve the performance of an optical raster-scanning system.

SUMMARY OF THE INVENTION

A method of operating a micromechanical scanning apparatus includes the steps of identifying a radius of curvature value for a micromechanical mirror and modifying a laser beam to compensate for the radius of curvature value. The identifying step includes the step of measuring the far-field optical beam radius of a laser beam reflected from the micromechanical mirror. The measured far-field optical beam radius is then divided by a theoretical far-field optical beam radius reflected from an ideal mirror to yield a ratio value M. An analytical expression for M is curve-fitted to experimental data for M with the focal-length as a fitting parameter. The focal-length value determined by this procedure, resulting in a good fit between the analytical curve and the experimental data is equal to half the radius of curvature of the micromechanical mirror.

The micromechanical scanning apparatus is operated by controlling the oscillatory motion of a first micromechanical mirror with a first micromechanical spring and regulating the oscillatory motion of a second micromechanical mirror with a second micromechanical spring.

The invention provides an improved optical raster-scanning micromechanical system. Mirror performance in the system is improved through the technique of characterizing and correcting static mirror curvature. Improved mechanical linkages that exploit symmetry reduce mirror wobble. A triangular control signal maximizes the linearity of the scan.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
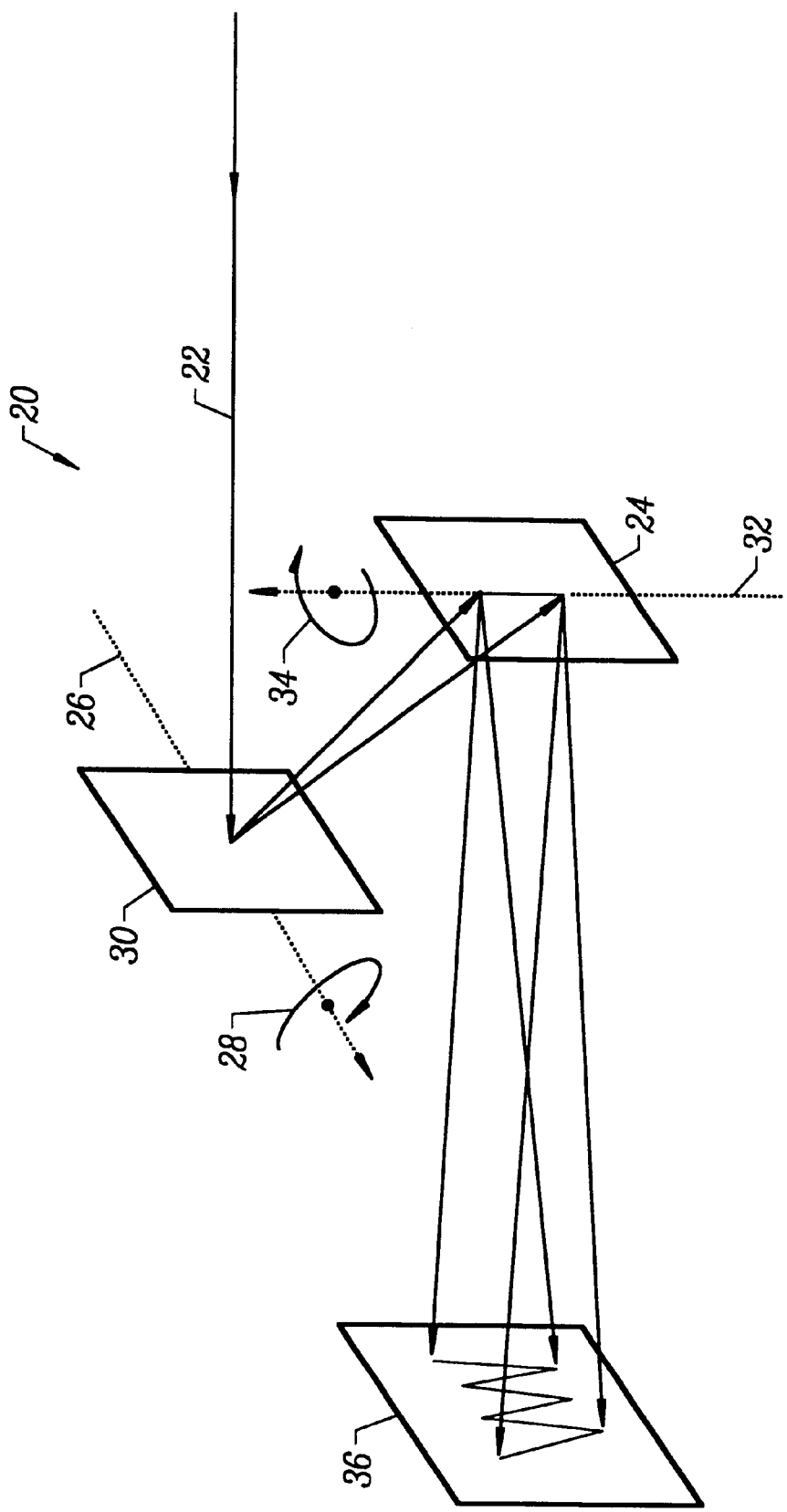
FIG. 1 illustrates an optical raster-scanning apparatus in accordance with an embodiment of the invention.

FIG. 1 is a simplified representation of an optical raster scanning system 20 constructed in accordance with an embodiment of the invention. The system 20 processes a laser beam 22 with a first mirror 30, implemented as a micromechanical device. The first mirror 30 may be a "fast mirror", as described below, which pivots about a first axis of rotation 26, causing first rotational motion, as shown with arrow 28. As described below, the first rotational motion is achieved by pushing or pulling the bottom edge of the mirror 30.

FIG. 1 also illustrates a second mirror 24, which is also implemented as a micromechanical device. The second mirror 24 may be a "slow mirror", as described below, which pivots about a second axis of rotation 32, causing second rotational motion, as shown with arrow 34. As described below, the second rotational motion is achieved by pushing or pulling the left and right sides of the mirror 24. By controlling the motion of the slow mirror 24 and the fast mirror 30, the laser beam 22 is projected onto a screen 36 to establish a predetermined pattern, as will be discussed further below.

Figure 2:
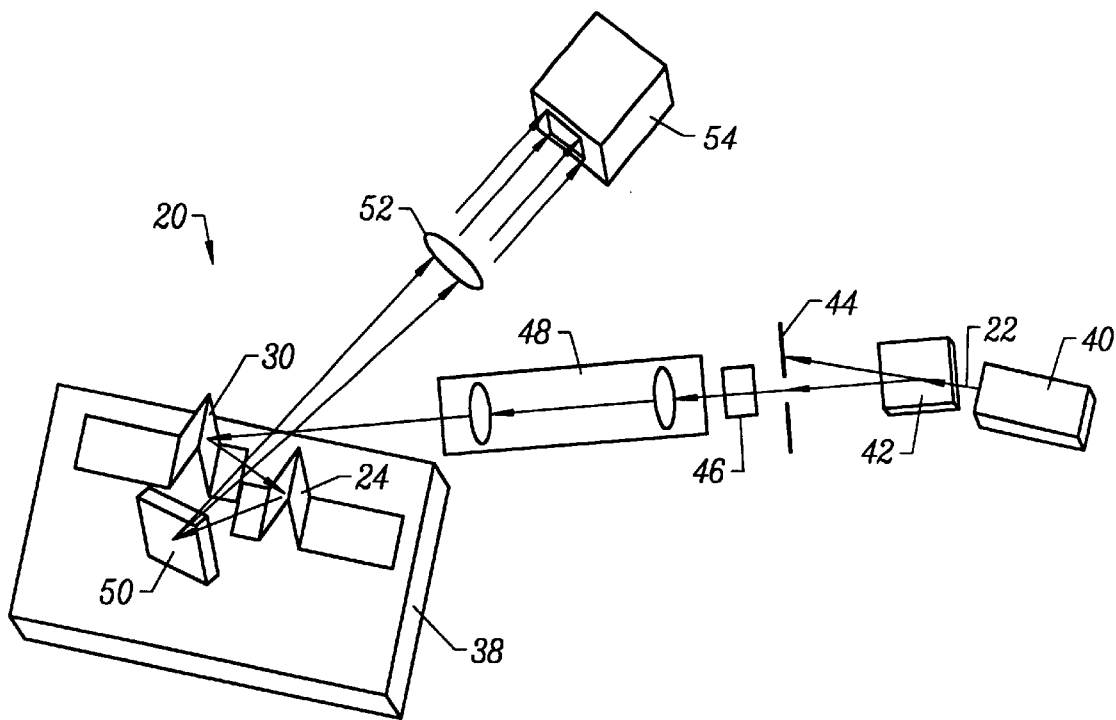
FIG. 2 illustrates an optical raster-scanning apparatus in accordance with another embodiment of the invention.

FIG. 2 is a more detailed depiction of an optical raster scanning system 20 in accordance with an embodiment of the invention. The system 20 of FIG. 2 has its mirrors 24 and 30 fabricated on a single semiconductor substrate 38. A laser 40 generates a laser beam 22, which passes through an acousto-optic modulator 42. The laser beam 22 is subsequently directed through a spatial filter 44 and through a mechanical shutter 46. Thereafter, in accordance with a feature of the invention, the laser beam 22 is processed by mirror curvature compensation optics 48. The optic assembly 48 operates to compensate for mirror curvature features that would otherwise degrade optical performance, as discussed in detail below. The laser beam 22 is then controlled by the first mirror 30 and the second mirror 24, with the laser beam 22 output being directed by an output mirror 50. Output optics 52 may process the laser beam 22 before it is applied to a camera 54 or screen.

Figure 3:
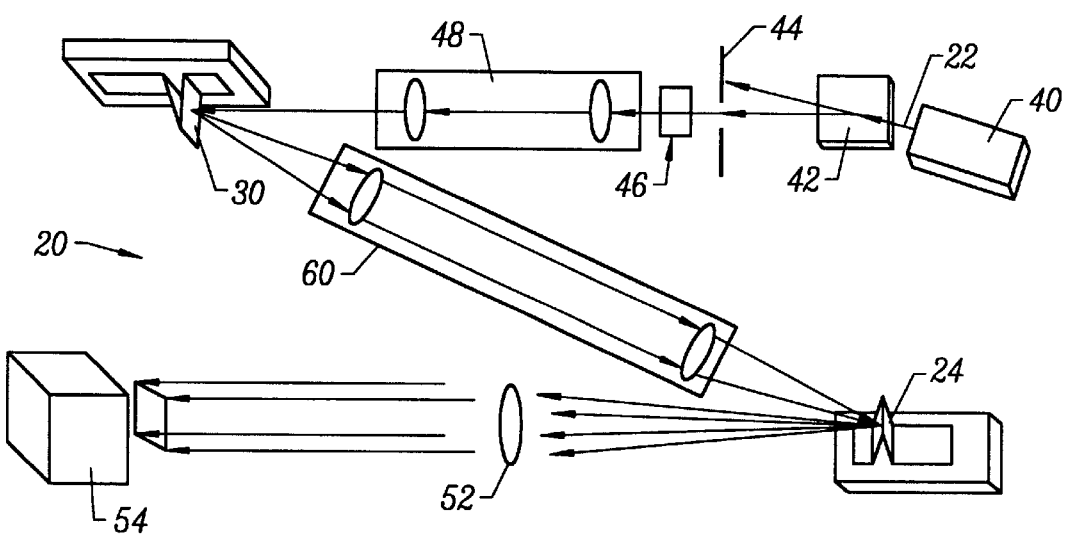
FIG. 3 illustrates an optical raster-scanning apparatus in accordance with still another embodiment of the invention.

The system of FIG. 3 corresponds to the system of FIG. 2 with two exceptions. First, in the system of FIG. 3, the mirrors 24 and 30 are not formed on a single substrate, instead they are individually fabricated. Second, imaging optics 60 are used between the first mirror 30 and the second mirror 24.

The micro-mirrors 24 and 30 are synchronized with a modulated light source. Modulation of the light source is used to display information with the raster-scanner. Switching the light on-and-off defines the pixels in the display. Grey-scale images can be generated with the use of analog or digital modulation of the light source. Laser diodes and light-emitting diodes are suitable for this application. Instead of a projection device 54, light from the micromirror display system can be projected directly on to the retina of the user. Projection on to the retina eliminates the need for a display screen in a head-mounted display. Such an embodiment reduces the weight and cost of the system.

Figure 4:
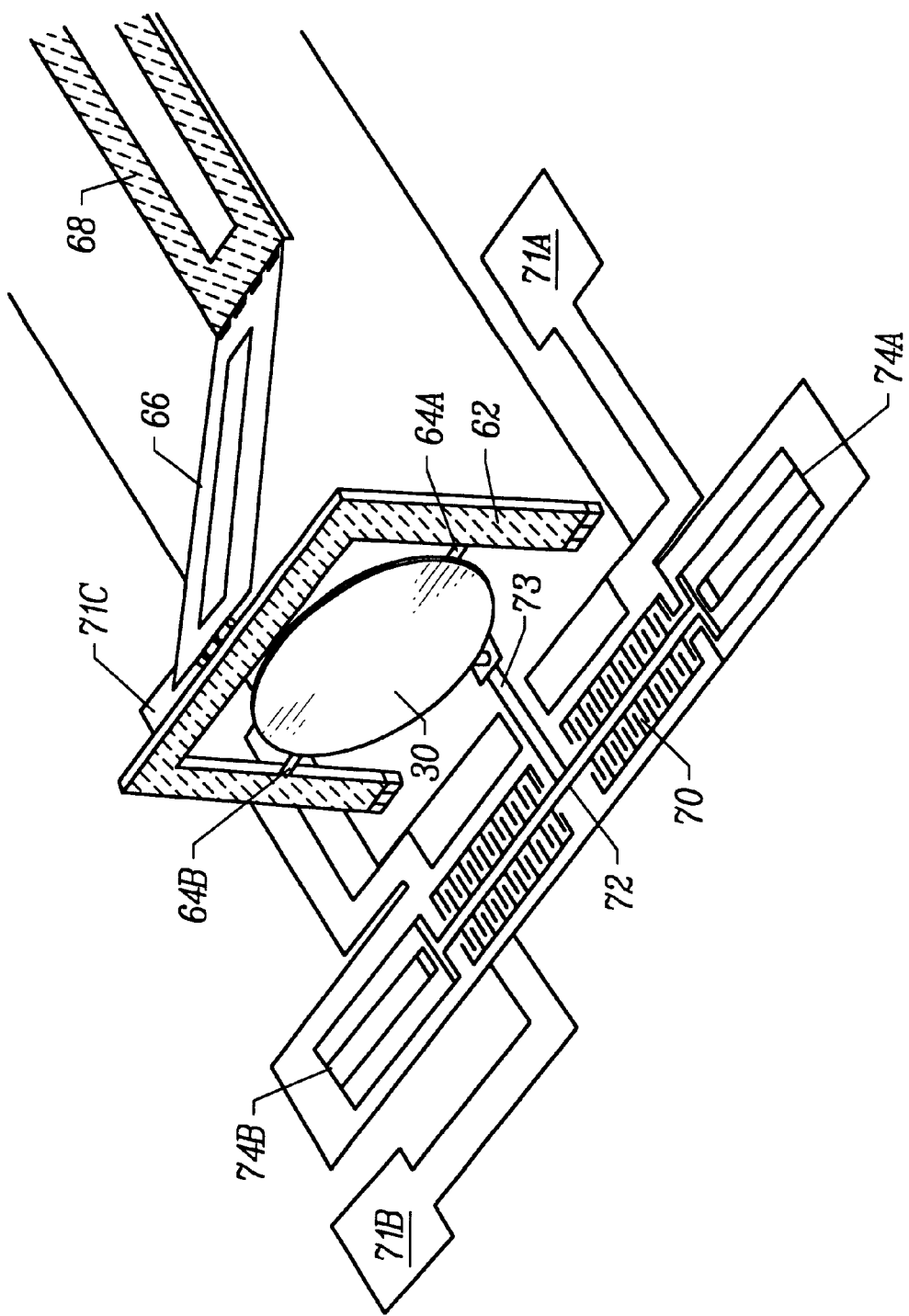
FIG. 4 is a perspective view of a fast mirror for use in accordance with an embodiment of the invention.

FIG. 4 illustrates a fast mirror 30 constructed in accordance with an embodiment of the invention. The mirror 30 is positioned within a mirror frame 62. Torsional bars 64A, 64B connect the mirror 30 to the mirror frame 62. The torsional bars 64 operate in the manner described in the previously referenced '297 patent. FIG. 4 further illustrates a mirror frame lift 66 and a mirror lifter 68. These devices may be fabricated and otherwise operate in accordance with prior art techniques.

The mirror 30 of FIG. 4 has an associated comb drive 70, which is controlled by electrodes 71A, 71B, and 71C. A comb drive central beam 72 is driven by the comb drive 70 in a controlled manner. The motion from the comb drive central beam 72 is transferred to a mirror slider 73, which pushes or pulls the mirror 30. More particularly, it pushes or pulls the bottom of the mirror 30 to rotate the reflected laser beam. The features discussed in connection with FIG. 4 are consistent with those described in the '297 patent, with the following exception. In accordance with the invention, the comb drive central beam 72 is attached to micromechanical springs 74A and 74B. The springs 74 operate to improve the controlled motion of the mirror 30. In the embodiment of FIG. 4, the springs 74 are axially aligned with the comb drive central beam 72. This configuration has been particularly successful in enhancing the range of motion for the fast mirror 30.

Figure 5:
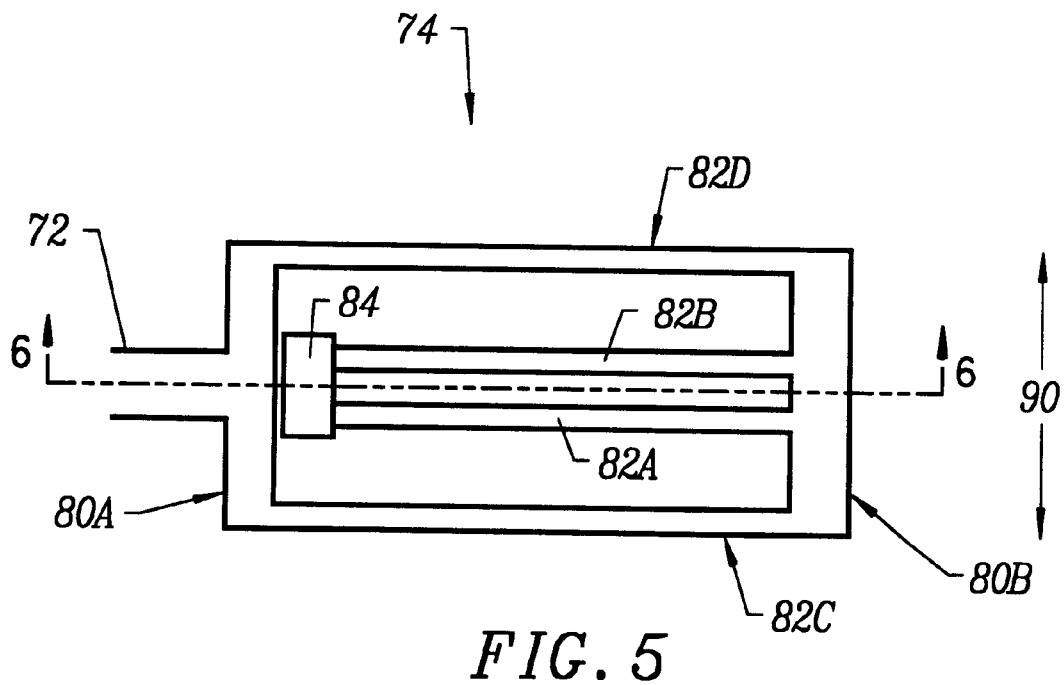
FIG. 5 is a top view of a spring utilized in accordance with an embodiment of the invention.

FIG. 5 is a top view of a spring 74 utilized in accordance with an embodiment of the invention. The spring 74 is attached to the comb drive central beam 72. The spring 74 includes two interior beams 82A and 82B, two exterior beams 82C, and 82D, and connecting bars 80A and 80B. Beams 82A and 82B are attached to an anchor 84.

Figure 6:
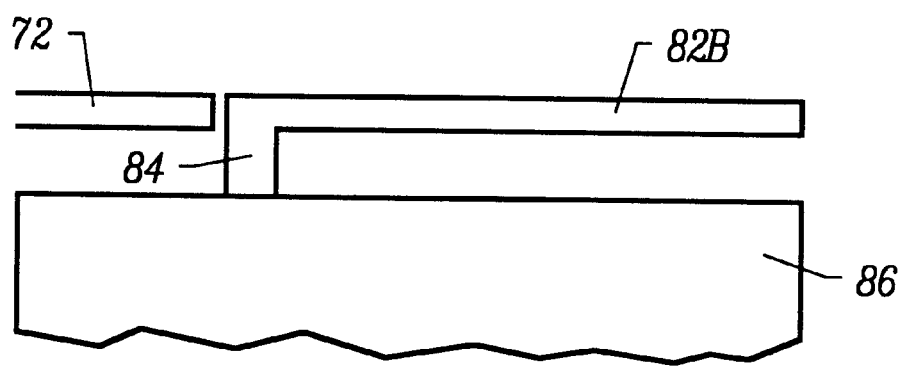
FIG. 6 is a side view of the spring of FIG. 5.

FIG. 6 is a side view of the spring 74 taken along the line 6—6 of FIG. 5. As shown in FIG. 6, the anchor 84 operates to suspend the spring 74 over its substrate 86. In particular, FIG. 6 illustrates that beam 82B is attached to the anchor 84, holding the beam 82B and the remaining portion of the spring above the substrate 86.

Back and forth motion, as illustrated by arrow 90 in FIG. 5, imparted by the comb drive central beam 72 from the comb drive 70 causes the beams 82 to flex in a controlled manner to improve the resultant motion imparted to the mirror 30.

Figure 7:
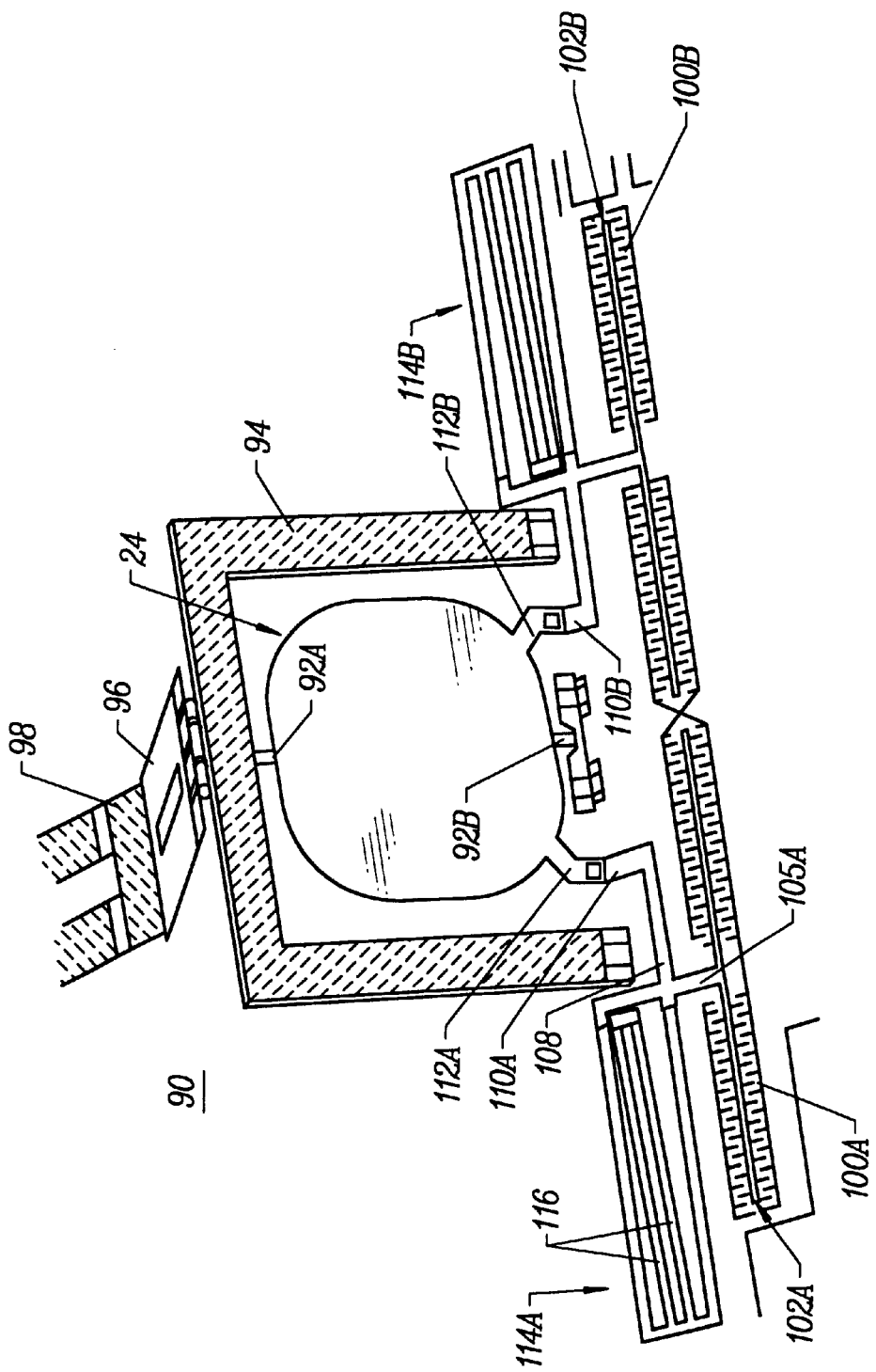
FIG. 7 is a perspective view of a slow mirror for use in accordance with an embodiment of the invention.

FIG. 7 illustrates a slow mirror 24 positioned on a substrate 90. The slow mirror 24 has torsion bars 92A and 92B respectively positioned at the top and bottom of the mirror 24. A mirror frame 94 supports the mirror 24, via the torsion bars 92A and 92B. A mirror frame lift 96 and mirror lifter 98 position the mirror 24 over the substrate 90.

FIG. 7 also illustrates individual comb drives 100A and 100B. Each comb drive 100A and 100B respectively controls an individual comb drive central beam 102A and 102B. Each comb drive central beam 102A/102B is attached to a mirror slider. Each mirror slider comprises a first transverse member (e.g., 105A), which is transverse to its linked comb drive central beam (e.g., 102A), an aligned member (e.g., 108), which is aligned or parallel with its associated comb drive central beam (e.g., 102A), and a second transverse member (e.g., 110A). The second transverse members 110A and 110B are respectively connected to mirror flanges 112A and 112B.

The motion of the slow mirror 24 is controlled by springs 114A and 114B, of the type described in connection with FIGS. 4–6. FIG. 7 illustrates that the spring 114A has deflected beams (e.g., 116). The orientation of the deflected beams indicates that the mirror 24 is being pulled at flange 112A (left side of the mirror out of the page) and pushed at flange 112B (right side of the mirror into the page).

As in the case of the fast mirror 30, the motion of the slow mirror 24 is controlled by springs. That is, the springs 114 improve the motion of the mirror slider components 108, 105, and 110, which improves the motion imparted to the mirror flanges 112. The configuration of FIG. 7 has symmetric actuation imparted by the comb drives 100 to produce improved mirror motion.

Figure 8:
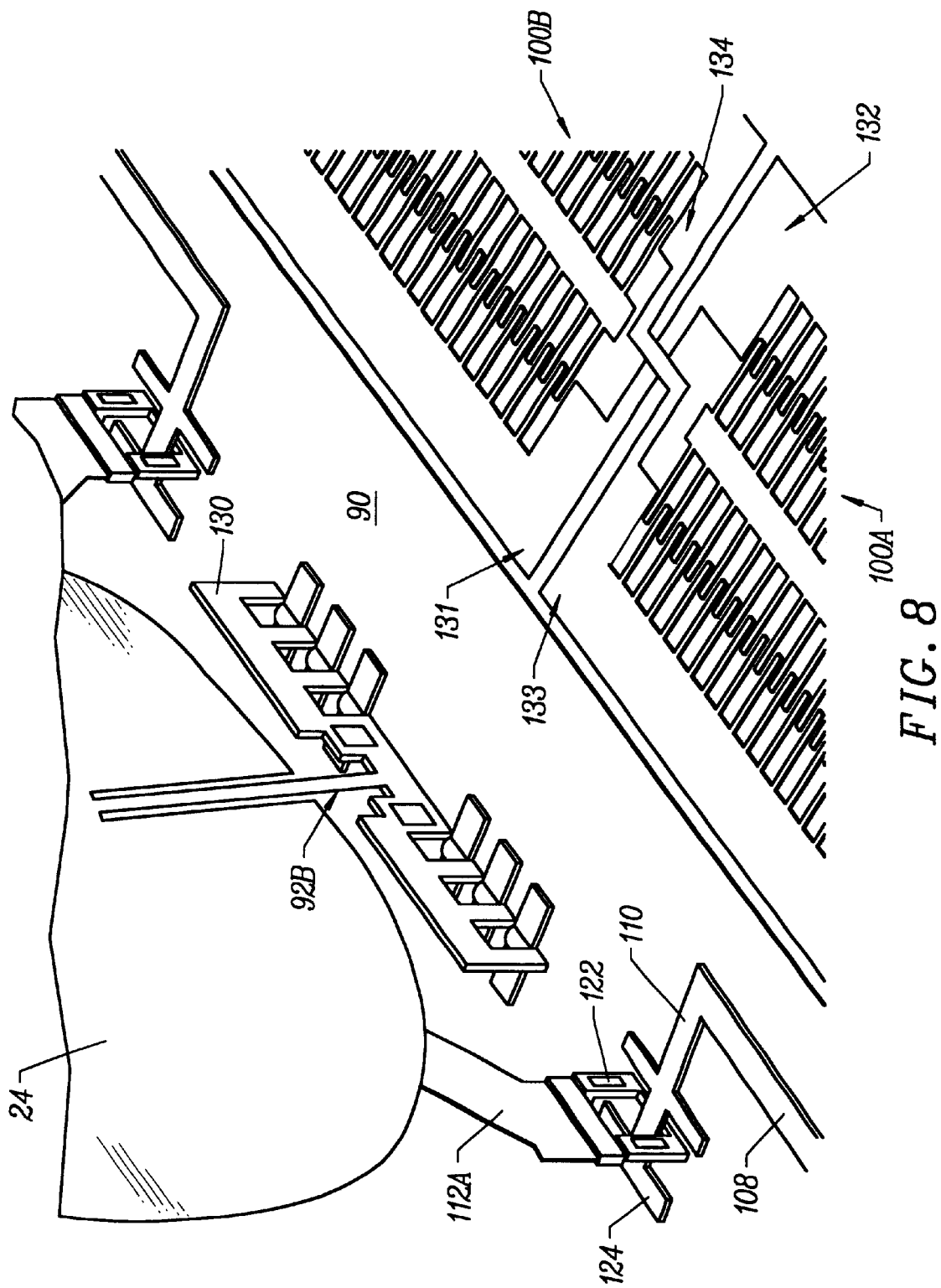
FIG. 8 is an enlarged perspective view of a portion of the slow mirror of FIG. 7.

FIG. 8 is an enlarged view of the bottom portion of the slow mirror 24. The figure illustrates the torsion bar 92B. The torsion bar 92B may be connected to a conventional pin and staple hinge 130.

FIG. 8 also illustrates the mirror flange 112A, which includes a box frame 122 at its terminal end. The second transverse member 110 of the mirror slider includes a T-shaped termination member 124, which is positioned over the bottom link of the box frame 122. The T-shaped termination member 124 insures that the second transverse member 110 and the mirror flange 112 stay assembled. A similar linkage mechanism is used between the fast mirror 30 and its slider 73. Note that the mirror slider components 105, 108, and 110 are suspended over the substrate 90, allowing controlled motion.

FIG. 8 also illustrates a portion of each individual comb drive 100A and 100B. Comb drive segment 131 of comb drive 100B is electrically connected to comb drive segment 132 of comb drive 100A. Similarly, comb drive segment 134 of comb drive 100B is electrically connected to comb drive segment 133 of comb drive 100A. If a voltage is applied to comb drive segments 133 and 134, the mirror slider pushes the mirror flange 112A into the plane of the page, while the opposite mirror slider pulls the opposite mirror flange out of the plane of the page, resulting in a clock-wise motion.

The physical components of the apparatus of the invention have now been described. Attention presently turns to a more detailed discussed of attributes associated with various physical implementations of the device. A detailed discussion of the operation of the device will also follow. In particular, the following description will address improvements in the control signals used in connection with the apparatus and techniques to improve the optical output of the apparatus by compensating for mirror shape anomalies.

Standard MEM processing techniques may be used to fabricate the mirrors and springs of the invention. In one embodiment of the invention, two free-standing polysilicon layers are used to create the mirrors (24, 30), comb-drives (70, 100) and tilt-up frames (66, 96). The devices may be fabricated with the Multi-User Microelectromechanical Systems Processes (MUMPs) described by K. W. Markus, et al., in "MEMS Infrastructure: The Multi-User MEMS Processes (MUMPs)", *Proc. SPIE*, Vol. 2639 (Micromachining and Microfabrication Process Technology, Austin, Tex., USA, 23–24, Oct. 5, 1995), p. 54–63. Similarly, the processing techniques described in the previously referenced '297 patent may be utilized. After fabrication, the devices may be released in a 49% Hydroflouric (HF) acid solution and dried in a supercritical Carbon Dioxide ($CO_2$) chamber. After release and drying, the chips may be covered with 50 nm of aluminum by blanket evaporation to enhance mirror reflectivity. Overhanging polysilicon structures are preferably used to avoid electrical shorts caused by metal deposition. This design feature was tested successfully on the single-chip scanner.

The mirrors (24, 30) and torsion beams (64, 92) have been implemented with 1.5 $\mu$m-thick polysilicon. The tilt-up frames, comb-drives and folded springs have been implemented with 3.5 $\mu$m-thick polysilicon. The tilt-up frames are used to raise the mirrors out-of-plane and hold them securely. The frames are connected to the mirrors by torsional hinges and to the chip surface by pin-and-staple hinges, as illustrated in FIGS. 4 and 7. The frames and mirrors may have 3 $\mu$m-diameter etch holes spaced on a 30 $\mu$m grid for fast release in HF. Each mirror, originally fabricated flat on the chip surface, may be assembled using a probe on a micropositioner. The probe is used to push forward the lifters 68, 98 which are connected to the back of the frames 62, 94. The mechanical stability of the scanning mirrors can be improved by fixing the frame joints with epoxy.

As previously discussed, the mirrors are actuated by comb-drives that are connected to the mirrors through hinges near the chip surface. The comb-drives move in the plane of the chip. The folded springs (74, 114) provide the majority of the stiffness for the actuator-mirror system. All comb-drives used to actuate the mirrors can be operated bi-directionally, i.e. two sets of comb teeth are used, one set pulling in the opposite direction of the other. At resonance, a mirror need only be driven in one direction, and the inertia of the system will cause it to oscillate nearly symmetrically about its equilibrium point. If a mirror is operated below its resonant frequency, it is must be driven bi-directionally to achieve maximum deflection.

As previously illustrated, the fast mirror 30 rotates about an axis parallel to the chip surface, and the slow mirror 24 rotates about an axis perpendicular to the surface. The fast mirror 30 may be implemented with a 65-by-500 $\mu$m rectangle flanked by two 500 $\mu$m-diameter half-circles, making the mirror nearly circular. In one embodiment, it rotates about its long (565 $\mu$m) axis, and has a resonant frequency of 4.68 KHz (FIG. 4). Fast-mirror frequency-response curves were collected from devices on several chips. Each mirror had a slightly different resonant frequency, ranging from 4.54 KHz to 4.68 KHz.

Figure 9:
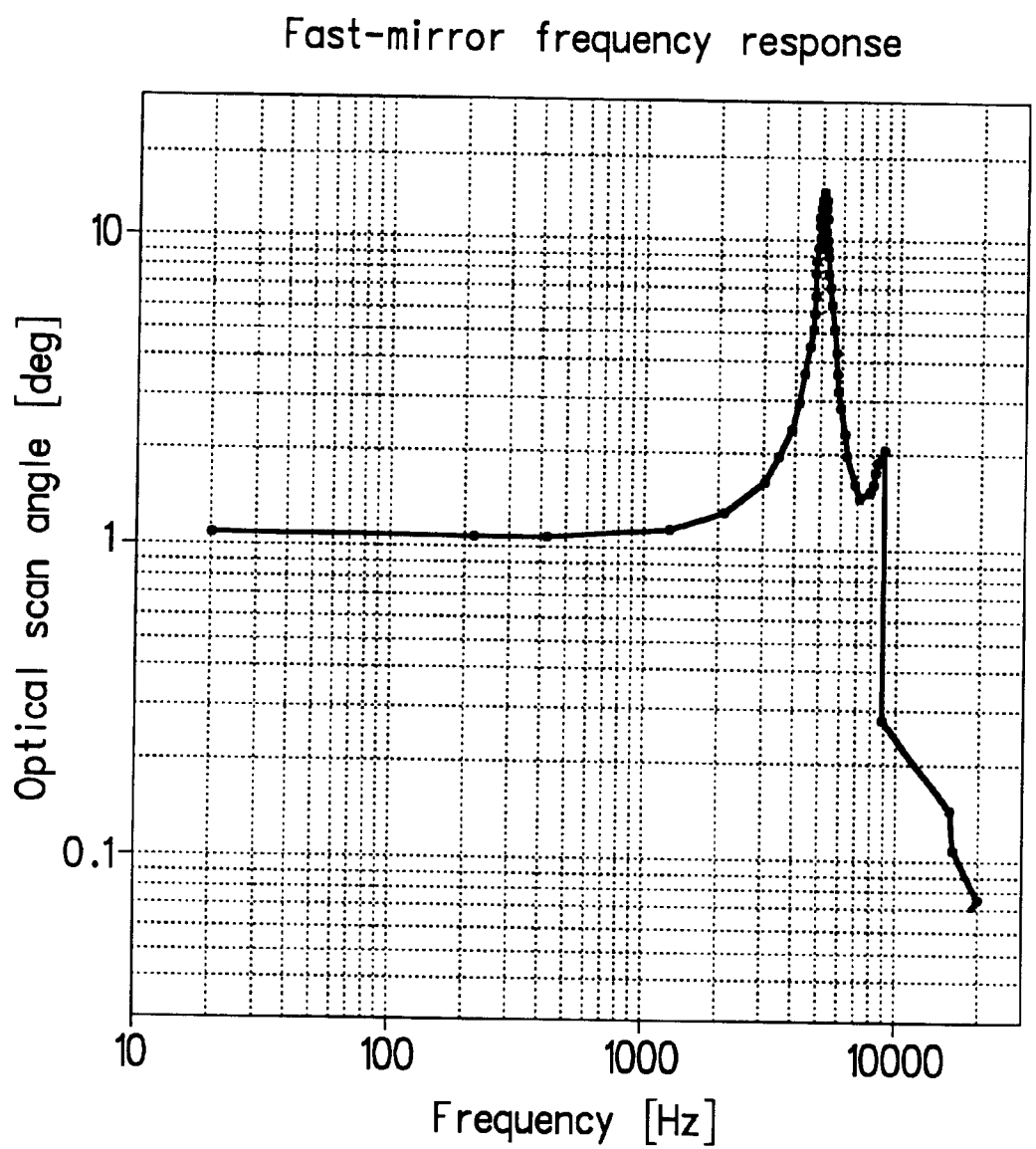
FIG. 9 illustrates the frequency response of a fast mirror constructed in accordance with an embodiment of the invention.

All fast mirrors were driven at 4.6 KHz when used to generate the horizontal component of a raster-scan. The device characterized in FIG. 9 is from a single-chip display. The fast-mirror torsional hinges 64 may be 50 $\mu$m×3 $\mu$m×1.5 $\mu$m, and the folded spring 74 may be 299 $\mu$m×3 $\mu$m×3.5 $\mu$m, supporting opposing banks of 66 comb teeth, each 40 $\mu$m×3 $\mu$m×3.5 $\mu$m. The measured optical scan angle of the fast mirror is 15 degrees when operated at resonance, driven with a 36.1 $_{rms}$ sine wave and zero DC offset. The slow mirror 24 may have the same shape as the fast mirror but may be elongated along its axis of rotation by the insertion of a 253-by-565 $\mu$m rectangle to collect the light from the fast-mirror scan. The slow mirror 24 may be actuated symmetrically by two banks of comb-drives (100A, 100B), each driven with a triangular voltage waveform at 60 $V_{pp}$ and zero DC offset. Driving the opposing comb-drives at 90 degrees out-of-phase results in a net triangular-force waveform. Using a triangular-shaped waveform instead of a sinusoidal driving signal increases the linear region of the slow-mirror scan.

The comb drives 100A, 100B for the frame-refresh (slow) mirror 24 of FIG. 7 are used to produce a push-pull force on the frame-refresh mirror 24. The frame-refresh mirror 24 must be driven in both directions because it is operating below its resonant frequency. It is advantageous for the mirror angle versus time to follow a triangular waveform centered about zero. By making a fast reversal of the scan direction at each edge of the frame scan (at the peak or valley of a triangular waveform), and holding a constant velocity over the majority of the frame, fast-scan lines can be easily projected with uniform spacing. Correction for non-linear velocity changes are not necessary.

The opposing comb drives 100A, 100B allow the use of piecewise linear, symmetric triangle waves to achieve a triangular force waveform for mirror actuation. If just one comb drive were used, the net electrostatic force would be proportional to the square of the applied voltage. If a triangular waveform were applied to a single comb drive, the resulting force would not be piecewise linear. A triangular voltage waveform applied to a mirror with the opposing comb drive design yields a net electrostatic force that is proportional to the input voltage (and phase-shifted). The optical modulation for the display need not be modified to correct for non-linear motion of the mirror.

Figure 10:
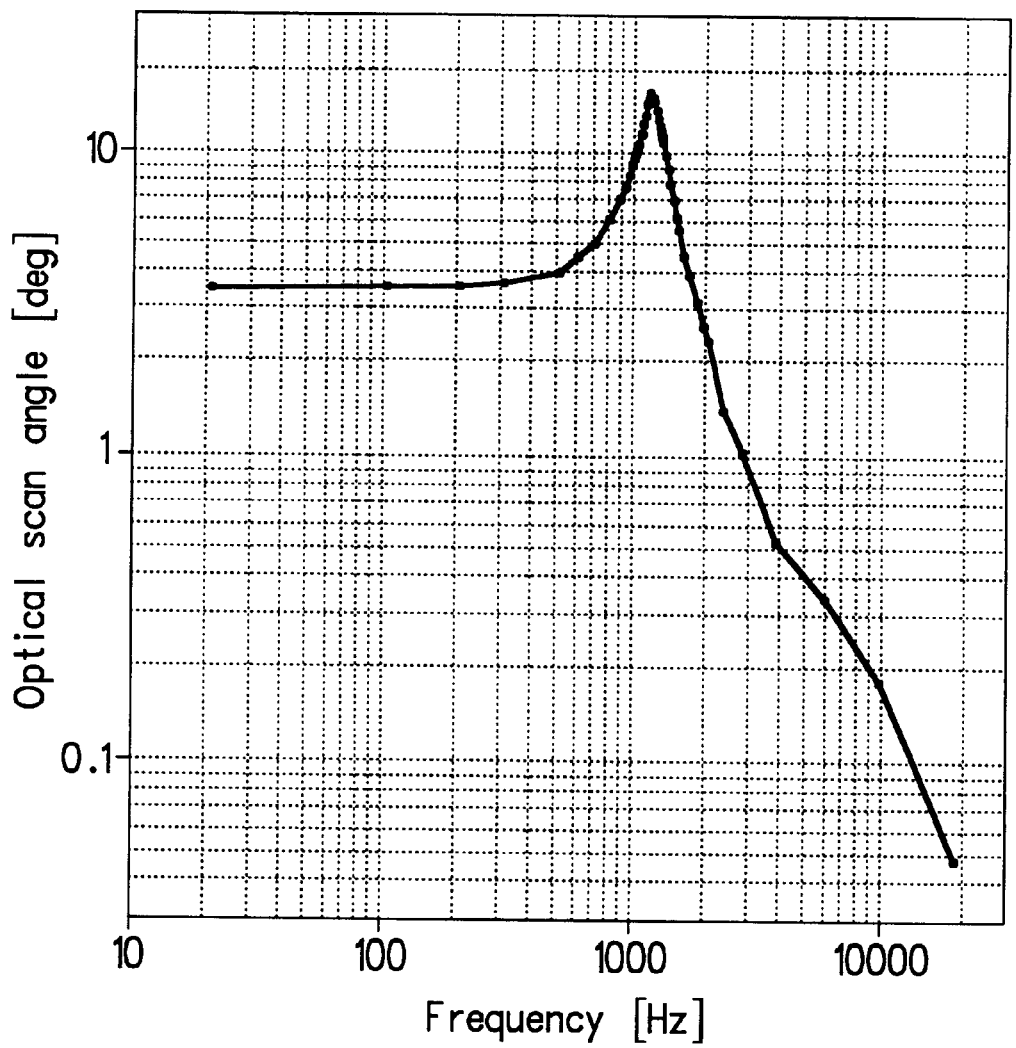
FIG. 10 illustrates the frequency response of a slow mirror constructed in accordance with an embodiment of the invention.

The slow-mirror folded springs 114 may be 600 $\mu$m×3 $\mu$m×3.5 $\mu$m. The comb tooth design is the same as that found on the fast mirror, except 132 teeth are available to drive the mirror in each direction. The slow mirror deflects the optical beam through 15 degrees on an axis orthogonal to the fast mirror and has a resonant frequency of 1.14 KHz, as illustrated in FIG. 10.

The slow mirror 24 moves at a sub-harmonic frequency of the fast mirror 30. This simplifies the driving electronics for the optical modulator. There are an integer number of line-scan cycles in the image refresh mirror cycle.

The resolution of a raster-display is determined by both mechanical-system issues and the optical quality of the mirror surfaces. The resonant frequency of the fast mirror limits the display resolution by restricting the number of lines that can be scanned during the image refresh period. In visual display systems, ergonomics must be considered when determining the image refresh rate. Factors that affect flicker perception include the location of the image in the visual field, the average luminance of the display, and direction of the raster scan. A high-quality scanning display should require an image refresh rate of about 100 Hz. Raster-scan images described herein make use of the left-to-right and top-to-bottom portions of the fast and slow mirror scans, respectively. Using the other half-cycle of the fast and slow-mirror scans boosts the mechanically-limited resolution by a factor of four.

The optical resolution is a function of the maximum optical scan angle divided by the angular divergence of the reflected laser beam, as described below. Curvature of the mirror surface increases the divergence angle of the reflected beam. Mirror curvature caused by actuation forces or stress gradients inherent in the fabrication process will therefore severely degrade the scan resolution if left uncorrected.

The laser 40 of FIGS. 2 and 3 may be a 5 mW, 633 nm Helium-Neon (HeNe) laser source. Unlike spatially incoherent sources, nearly all of a laser's optical power can be focused onto the surface of a micro-scanning mirror, and eventually to the display screen 36 (FIG. 1). This simplifies the transfer of high-optical power density through microoptical systems. In addition, optical analysis is simplified by the narrow spectral and uniform phase characteristics of the laser. The following discussion assumes that the light source is monochromatic and spatially coherent with a transverse Gaussian distribution.

Within the Gaussian beam propagation model, the best resolution for an optical scanner is obtained by positioning the waist of the incident optical beam at the surface of the micromirror and the image plane in the far-field. A number of different geometries will achieve the same resolution as this configuration, but none are likely to improve performance. The standard rule of thumb for analog (scanning) cathode ray tube designs is that neighboring pixels should be separated by the Full Width at Half Maximum (FWHM) of their intensity. Given this criterion, the number of resolvable spots for a one-dimensional scanner is given by:

$$N = \frac{\alpha \pi \omega_m}{1.178 \lambda} \quad \text{(Equation I)}$$

where $\alpha$ is the optical scan angle, $\omega_m$ is the radius of the optical beam waist on the mirror (in this discussion, optical beam radius always refers to the radius of the laser beam at its $1/e^2$ intensity value), and $\lambda$ is the optical wavelength. To improve the resolution, it is necessary to increase the product $\alpha \omega_m$. Mirrors that accept a large optical beam and rotate through large angles are desired.

Equation I represents an ideal scanning mirror that is perfectly flat and of infinite extent. Curvature and imperfections of the optical surface, as well as the finite size of a real mirror, will reduce the resolution. Stress-gradient-induced mirror curvature is dominant among these. In the disclosed two-mirror display system, mirror curvature will typically cause an increase in the area of the far-field optical beam by a factor of more than 1000 if left uncorrected. By approximating the curved-mirror profile as parabolic, one can calculate the increase in the far-field beam size and the proportional reduction in resolution. This may be expressed as the ratio M of the actual optical beam radius to the theoretical beam radius for an ideal, flat mirror of infinite extent $$M = \frac{1}{|f|\lambda}\sqrt{(f\lambda)^2 \cdot (\pi \omega_m^2)^2} \quad \text{(Equation II)}$$

where $f$ is the focal length of the mirror and $\omega_m$ is the radius of the incident optical beam waist on the mirror.

Figure 11:
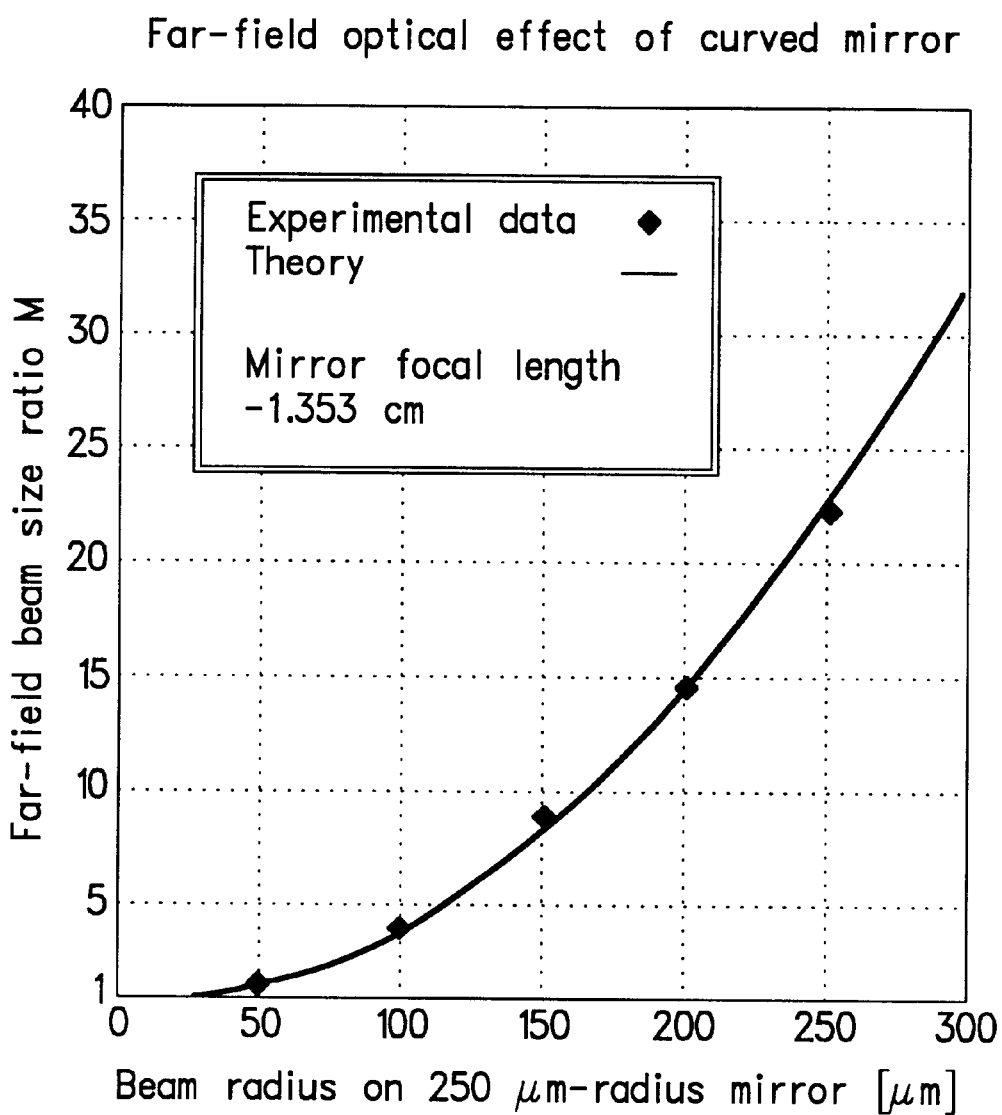
FIG. 11 illustrates far-field optical effects of a curved mirror, this information is used in accordance with the invention to compensate for mirror curvature.

To optically compensate for the curvature of a micromirror, its radius of curvature, or equivalently, the focal length of the mirror, must be found. To do this, the far-field optical beam radius is measured for several laser beam waist sizes on the mirror. Dividing the measured far-field optical beam radius by the theoretical far-field optical beam radius of a perfectly flat, infinitely large mirror yields the value of M. Typical examples of experimentally determined values of M for scanners of the invention are plotted in FIG. 11. Equation II is fitted to these points with $f$ as a fitting parameter. Equation II is, strictly speaking, only valid for a mirror of infinite extent, but may be used to fit data for the following reasons. First, for small incident beam-waist-radii less than three times the mirror radius, there is effectively no diffraction off the mirror edges. Second, larger incident optical beams are greatly expanded by the mirror curvature in the far-field, causing the relative influence of the aperture effect to be small.

Testing with polysilicon mirrors indicates that resolution loss due to curvature is small for an incident beam waist less than 50 $\mu$m. Equation I, however, shows that larger beam radii, and thus larger mirror sizes, are desired to increase resolution. Increasing the radius of the laser beam on the mirror causes an increased sensitivity to mirror curvature. The mirror characterized in FIG. 11 has an edge-to-center bow of approximately 1.2 $\mu$m, which is enough to cause an increase in the far-field optical beam area by a factor of 506 when the mirror is filled with a 250 $\mu$m-radius waist. Stress gradients in the polysilicon, inherent to the fabrication process, are the suspected cause of curvature in the mirror. While it may be difficult to flatten the mirror by entirely eliminating stress gradients from the polysilicon, an optical correction is achieved in accordance with the invention.

Once the focal length is known, the mirror curvature can be optically canceled by appropriately forming the phase front of the incident optical beam. Using the Gaussian beam propagation model, a two or three-lens system can be designed to pre-form the laser beam such that the waist of the reflected beam is at the surface of the second mirror in a two-mirror system. Orthogonal axes on each mirror can be independently optimized with cylindrical optics. Curvature is the dominant factor in reducing resolution. By correcting for curvature in a two-mirror system, the radius of the optical beam in the image plane is reduced by a factor typically between 30 and 40. This brings the measured far-field optical beam size to within 12% of its diffraction limit (including the aperture effect, see below) simultaneously on both axes of a single-chip scanner.

Figure 12:
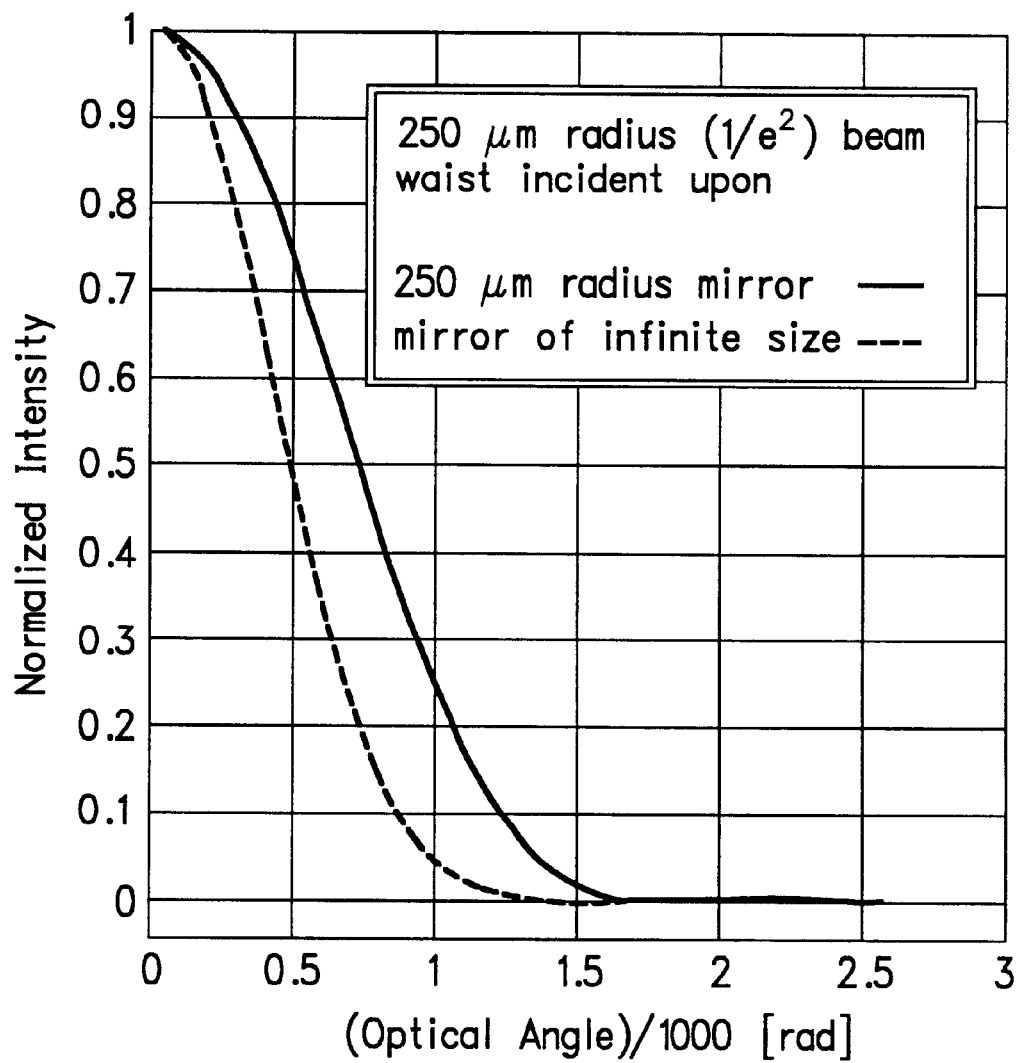
FIG. 12 illustrates the aperture effect of a mirror in the far-field.

Once the mirror curvature is optically compensated in accordance with the invention, the aperture effect of the mirror becomes significant in determining the diffraction-limited far-field optical beam size. Truncation of the Gaussian laser beam at the mirror broadens the far-field intensity distribution and causes side lobes to appear about the central intensity maximum, as illustrated in FIG. 12. The relative power in the central and side-lobes is dependent upon the ratio of the incident optical beam radius to the mirror radius. As stated above, if the radius of the mirror is at least three times the radius of the optical beam, the aperture effect of the mirror becomes negligible. Increasing the radius of the incident optical beam reduces the central lobe width of the diffraction patterns. A larger incident beam radius also increases the power in the side-lobes, which is undesirable for display applications. In addition, reflection off of the tilt-up frame surrounding the mirror increases with incident optical beam size, causing artifacts in the raster-scanned image. Taking these factors into consideration, a 250 $\mu$m-incident beam radius may be chosen, roughly equivalent to the fast mirror size. For this case, minimal reflection off of the frame is observed, and the power in the side lobes is low. The central lobe, however, expands by about 49% compared to an un-apertured beam, as demonstrated in FIG. 12, and this expansion leads to a proportional reduction of the number of resolvable spots compared to the infinite-mirror case (equation I).

Figure 13:
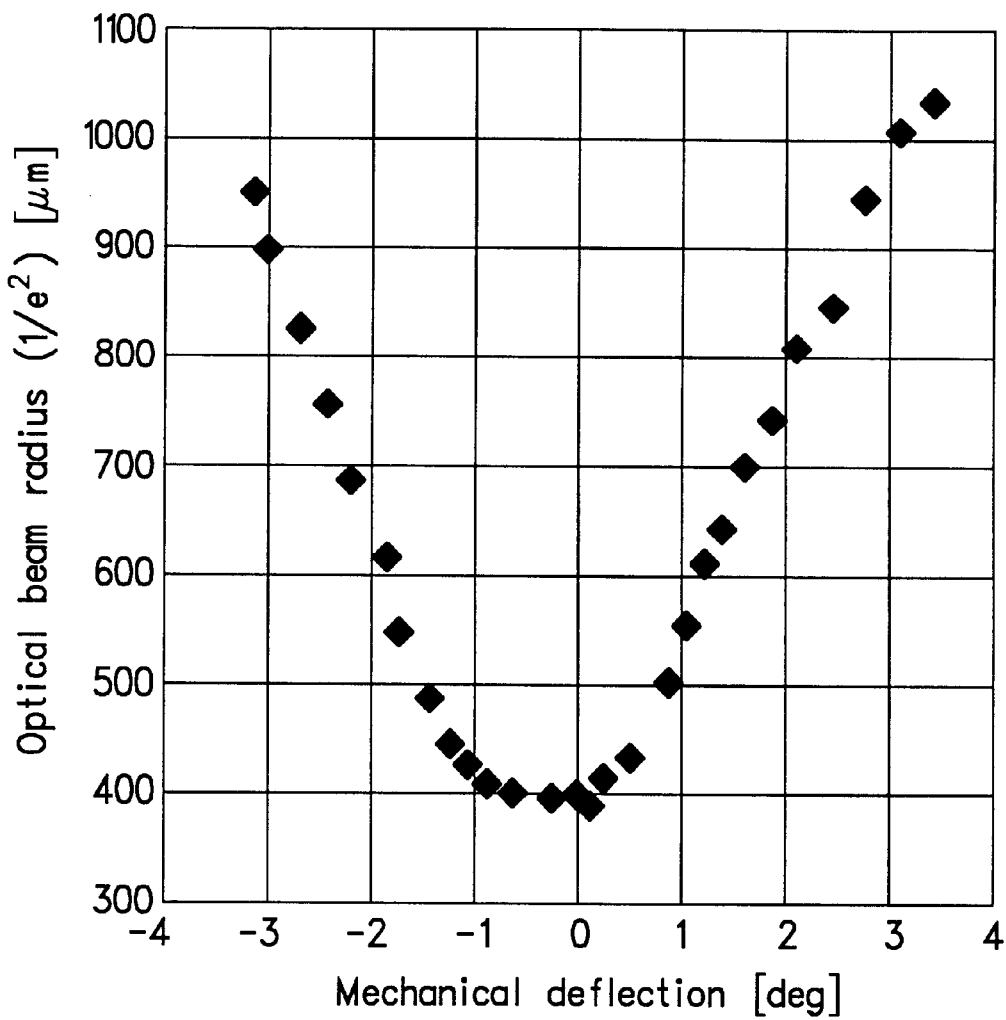
FIG. 13 illustrates the effect of mirror deformation due to comb drive actuation.

Actuation forces on the mirrors will also influence the resolution. The actuators disclosed herein are connected directly to the bottom edges of the mirrors through hinges. The comb-drives induce a torque about the mirrors' torsional hinges, with the mirror surface acting as the moment arm. The applied force at the edge of the mirror causes bending of the optical surface that varies with the rotational position of the mirror. FIG. 13 documents the effect of mirror bending on the far-field optical beam size. The optical beam size at zero deflection is 400 $\mu$m, close to the 361 $\mu$m-predicted diffraction-limit for a 250 $\mu$m beam on a 250 $\mu$m mirror and a 30 cm-focal-length output lens. Through the entire range of actuation shown in FIG. 13, the difference between the optical beam radii on perpendicular axes in the far-field remained less than 15%, indicating bending along both axes of the mirror surface. Connecting the comb-drives to an independent lever arm that is attached to the mirror near the torsional hinges will remedy the problem of curvature induced by static actuation forces.

Inertial and dynamic forces can also play a role in bending the mirror surface. Preliminary data suggest that dynamic curvature of the fast mirror has a measurable influence on the far-field beam size when the scanner is operated at resonance.

The preceding mechanical and optical analyses were used in the design and testing of individual micromachined scanners. The two-mirror raster-scanner design relies on information collected from individual mirrors. The following discussion focuses on the results from single-chip and dual-chip raster scanners.

In the single-chip design, the fast and slow mirrors are positioned opposite each other, separated by an optical path length of 936 $\mu$m. One method of optical correction for the mirror curvatures requires that the incident optical beam form a virtual waist behind the fast mirror. The fast mirror is tilted back approximately 3 degrees from the perpendicular, allowing the converging incident laser beam to reach the mirror without grazing the chip surface. The slow mirror is normal to the chip surface. The stationary output mirror accepts light from the slow mirror and re-directs it through the output optics to the display screen or camera.

A 5.02 cm-focal-length lens, followed by a cylindrical concave lens with focal length –833.3 cm and a 10 cm-focal-length lens correct for the combined curvature of the two-mirror system. The output mirror, made of single-crystal silicon, has negligible curvature. The optical surface of the output mirror must be within approximately 50 $\mu$m of the chip surface to capture the full raster scan, and the top of the mirror must tilt away from the slow mirror to direct the light off-chip. To produce a sharp edge at the base of the mirror, the silicon was etched in a KOH bath along a crystalline plane at 54.7 degrees with respect to the polished mirror surface. A micropositioner orients and holds the output mirror in place. The output optics consist of a 10 cm-focal-length lens and additional optics used to photograph the scan. Due to the geometry of the camera, two 30 cm-focal-length lenses in an 4-f configuration were needed to transfer the image, found at the back focal plane of the 10 cm lens, into the camera. After exiting the second 30 cm-focal-length lens, the light falls directly onto the film. Direct imaging of the display onto film eliminates speckle, commonly found in laser projection systems. Speckle is caused by optical interference in the light scattered from a projection screen due to roughness of the screen surface.

To increase the rigidity of the tilt-up frames, all stationary hinge joints are preferably epoxied, with the exception of two joints at the base of the slow mirror frame. Epoxy was not applied to these stationary hinges because the adhesive could potentially spread to nearby actuator members, causing them to freeze in position.

An acousto-optic modulator in the beam path adjacent to the laser source (element 42 in FIGS. 2 and 3) switches the light on-and-off with a signal that is synchronized to the mirror driving voltages. The acousto-optic modulator turns off the light in a narrow region (about 7% of the display width) at each edge of the horizontal scan. This non-linear turnaround region of the fast-mirror is not used for image display. A mechanical shutter 46 selects a half-cycle of the slow mirror to expose the film. The corrected optical beam size in the center of the image plane was within 12% of the theoretical diffraction-limited prediction. The smallest pixel size is at the center of the display, with no voltage applied to the actuators. If the display were filled with pixels of this size, its resolution would be 176 by 176. Accounting for the turn-around region on the horizontal scan, the resolution is 151 by 176. However, the pixel size varies according to mirror angle.

The highest-resolution region in the image plane is a rectangle running the full height of the display and covering about 25% of the horizontal scan width. In this portion of the display, there is little deviation of the optical beam size from its minimum. Outside of this area, the scan lines become blurred. At the extreme edges of the display, the far-field beam size expands by roughly a factor of 2.5. By linear approximation, the laser beam expands in size by an average factor of 1.75 over 75% of the display. The horizontal display resolution can be approximated based on average pixel size to be 0.86*176*(0.25+0.75/1.75)=102 pixels. This average pixel size is used to define the horizontal line spacing because the optical beam is essentially circularly symmetric. Therefore, the vertical resolution based on average pixel size is approximately 176*(0.25+0.75/1.75)=119, because the fast and slow mirrors rotate through the same angle. There is effectively no resolution loss to turn—around regions in the slow-mirror scan because it is driven by a triangular waveform.

Several raster-scanned images were photographed to demonstrate the display system. Dynamic effects, such as jitter and wobble, degrade the image quality. Jitter in the slow mirror causes bright horizontal lines, resulting from overlapping line scans. Three effects play a role in expansion of the far-field optical beam size at the end of the fast mirror scan line: static mirror deformation, dynamic mirror deformation, and wobble of the fast mirror. Wobble amplitude in the single-chip design appears to be less than the average pixel width. Sub-harmonic wobble was found in the two-chip raster-scanner, which is discussed below.

A second optical raster-scanning system was tested independently of the single-chip scanner. The two-chip raster-scanner makes use of two fast mirrors oriented with orthogonal scan axes, as shown in FIG. 3. One of the fast mirrors performs the same function as the slow mirror in the single-chip design. In this embodiment, none of the tilt-up frames were epoxied. The fast and slow-moving mirrors were operated at 5.3 and 5.7 degrees of optical deflection, respectively. Both mirror frames were tilted back with an angle of approximately 7 degrees from the perpendicular. The curvature-correction optics described in the previous section are used with the exception of the cylindrical lens. An optical assembly 60 with two 6.29 cm-focal-length lenses in a 4-f configuration is inserted between the mirrors to image the fast mirror onto the slow-moving mirror. These lenses could also be used to correct for mirror curvature. The output optics consists of a 30 cm-focal-length lens. The camera is positioned at the back-focal-plane of the output lens. The corrected far-field optical beam size in the image plane is 17% larger than the predicted diffraction limit. Compared to the single-chip design, a proportionally smaller region of the image is affected by curvature due to actuation because the scan angle is smaller. The resolution based on average pixel size is estimated to be 61 by 65 pixels.

Jitter of the slow-moving mirror in the two-chip system is less prominent than in the single-chip display. The basic mechanical design of the fast mirror, when used as a slow-moving mirror in the two-chip display, may have superior jitter characteristics over the slow mirror design in the single-chip display. The fast-mirror wobble amplitude in the two-chip display, however, is significantly greater than the corresponding wobble amplitude found in the single-chip design. This may be due to more motion of the supporting frames because they were not epoxied in place. The wobble amplitude is greater than the horizontal line separation and the wobble frequency is lower than the rotational frequency of the fast mirror. When the system is operating as a display, the acousto-optic modulator selects the upper half-cycle of each line-scan, selectively switching the light off as the mirror wobbles. Mirror wobble in the two-chip system also interleaves the scan lines, causing the horizontal lines from top-to-bottom to be drawn out of sequence. To display the raster-image data in the correct sequence, every-other line-scan half-cycle was selected by the acousto-optic modulator. To maintain proper line spacing in this situation, the slow-scanning mirror frequency must be reduced by half.

In sum, an improved surface-micromachined raster-scanning display has been disclosed. The apparatus has been implemented with a resolution of 151 by 176 pixels, and an average resolution of 102 by 119 pixels in a single-chip system. The tilt-up polysilicon mirror design allows for large mirror size and deflection both shown to be necessary for high-resolution displays. Mirror curvature was found to be the primary factor that reduces resolution in micromachined scanners. The mirror curvature was characterized by measuring the far-field intensity distributions for a series of incident optical beam sizes and fitting the data to a theoretical curve. Information gathered from this technique determines the configuration of curvature-correcting optics that pre-form the optical beam incident on the scanners. This method successfully reduced the laser beam radius in the image plane of the single-chip raster scanner by more than an order of magnitude, bringing it to within 12% of the theoretically-predicted diffraction limit.

Once the static mirror curvature was corrected, the factors limiting resolution and image quality were actuation-induced bending, jitter and wobble of the scanning mirrors. Modifying the fast mirror design by removing the direct connection of the comb-drive to the bottom of the mirror is expected to increase the resolution of the display. Deformation of the mirror can be avoided by connecting the comb-drive to the mirror through separate polysilicon beams that attach to the edges of the mirror near its rotational axis.

To reach VGA resolution, the mirrors must increase in size and tilt-angle, and the resonant frequency of the fast mirror should be boosted. Maximizing the mechanical force output of the comb-drive actuators will be required to reach a sufficiently high resonant frequency. It is likely that stiffening of the fast-mirror surface to reduce dynamic bending will also be necessary.

Those skilled in the art will appreciated that the disclosed technology can be used in light-weight, low-power, and low-cost video displays. For a flicker-free video display, the slow mirror should operate between 30–100 Hz. The video line-scan rate should be between 30–100 kHz. In the demonstrated single-chip display, one line is drawn for each half-cycle of the fast mirror, and no lines are drawn during half of the slow mirror cycle. If information is displayed during both half-cycles of the fast and slow mirrors, the effective line-scan rate (the number of lines drawn during one slow mirror cycle) increases by a factor of four. A 10 kHz fast-mirror that has already been demonstrated could produce an equivalent line-scan rate of 40 kHz which is sufficient to display video. The following mechanical enhancements will improve system performance: increasing rotational angle and size of the mirror enables higher resolution displays, increasing the stiffness of the mirror springs increases the line-scan rate, and increasing the mirror stiffness ensures uniform pixel size across the display.

Those skilled in the art will appreciate that a variety of techniques may be used to measure mirror curvature. A mirror may be placed in a device designed to measure the mirror curvature. The far-field characteristics of an optical beam reflected off of a micro-mirror can be used to compute the mirror curvature. The instruments used to measure the far-field optical beam size may be placed anywhere in the far-field (this can be advantageous) at a known distance from the mirror, and only one measurement may be required. From these measurements, the mirror curvature can be theoretically extracted and used to design corrective optics. The corrective optics may be placed before, between, or after the mirrors. In some cases it may be advantageous to place lenses in two or all three locations. In the case of a micro-display system, it may be advantageous to place all of the optics after the mirror system to minimize the number of micro-lenses that need to be mounted on the chip.

It is not necessary to remove a micro-mirror from the display system to measure micro-mirror curvature. Corrective optics can be optimized for the curvature of an individual mirror by adjusting lens positions or adjusting the placement of the projection screen in the display system, using the display system laser as the measurement beam. This process finds the mirror curvature and tunes the corrective optics at the same time, potentially simplifying the process of building a working display.

Placement of bulk mirror-curvature correction optics that lie external to the microscopic system may be used in manufacturing micro-displays. In such a case, the light source and mirrors are assembled on a substrate and are incorporated into a package, without the need to customize the optics in the package. Mirror curvature correction is performed later with a macroscopic lens. Mirror curvature can be corrected by appropriate selection of the output optics, optimum placement of the display screen, or a combination of the two.

There are numerous causes of mirror curvature, including stress-gradients, thermal expansion and contraction, static, dynamic, and inertial forces. A system can be engineered to cancel the combined effect of mirror curvature in both mirrors without inclusion of external curvature-correcting optics. A convex mirror immediately following a concave mirror with the same absolute radius of curvature can be used to cancel the effect of mirror curvature. Similarly, a concave mirror followed by a convex mirror with the same absolute radius of curvature cancels the curvature effect.

In micromachined systems, curvature due to stress-gradients is often uniform over the small region of the substrate on which the display is fabricated. By fabricating one mirror with its optical surface facing down, and the other mirror with its optical surface facing up (before assembly), the mirrors have opposite concavity after release. After release and assembly, one mirror is convex and the other concave. The divergence or convergence that the first mirror induces in the reflected optical wavefront is largely canceled after reflection from the second mirror.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, the thereby enable others skilled in the art to best utilize the invention and various embodiments with various modifications as are suited to the particular use contemplated. It is intended that the scope of the invention be defined by the following claims and their equivalents.

What is claimed is:

1. An optical scanning device, comprising:
    a first micromechanical mirror;
    a first micromechanical drive mechanism;
    a first micromechanical spring attached to said first micromechanical drive mechanism to control the motion applied to said first micromechanical mirror from said first micromechanical drive mechanism;
    a second micromechanical mirror;
    a second micromechanical drive mechanism that is implemented as a set of comb drives that control the position of two points of said second micromechanical mirror; and
    a second micromechanical spring attached to said second micromechanical drive mechanism to control the motion applied to said second micromechanical mirror from said second micromechanical drive mechanism.

2. The optical scanning device of claim 1 wherein said first micromechanical drive mechanism is implemented as a single comb drive that controls the position of a point of said first micromechanical mirror.

* * * * *